United States Patent
Rutherford et al.

(10) Patent No.: US 7,017,976 B1
(45) Date of Patent: Mar. 28, 2006

(54) AWNING COVER FOR SLIDE-OUT UNIT FOR RECREATIONAL VEHICLES

(75) Inventors: Jeffrey B. Rutherford, Longmont, CO (US); Robert Wagner, Longmont, CO (US)

(73) Assignee: Carefree/Scott Fetzer Company, Broomfield, CO (US)

( * ) Notice: Subject to any disclaimer, the term of this patent is extended or adjusted under 35 U.S.C. 154(b) by 0 days.

(21) Appl. No.: 10/964,840

(22) Filed: Oct. 13, 2004

(51) Int. Cl.
*B60P 3/34* (2006.01)
*E04H 15/08* (2006.01)

(52) U.S. Cl. .......................... 296/163; 160/70; 160/79; 135/18.12

(58) Field of Classification Search ................ 296/163; 160/66, 67, 69, 70, 78, 79, 22; 135/88.11, 135/88.12
See application file for complete search history.

(56) References Cited

U.S. PATENT DOCUMENTS

| 5,752,536 | A | * | 5/1998 | Becker | 135/88.1 |
| 6,006,810 | A | * | 12/1999 | Malott | 160/67 |
| 6,457,508 | B1 | * | 10/2002 | Tomita | 160/67 |

\* cited by examiner

*Primary Examiner*—Dennis H. Pedder
(74) *Attorney, Agent, or Firm*—Dorsey & Whitney LLP

(57) ABSTRACT

A retractable awning cover for a slide out unit on a recreational vehicle, mobile home, travel trailer or the like includes a scissors arm support system that elevates a support bar running longitudinally of the vehicle to establish a gable shape for the awning cover when extended. The support bar is automatically lowered during retraction so as to be alignable with the scissors arms that support the support bar.

10 Claims, 11 Drawing Sheets

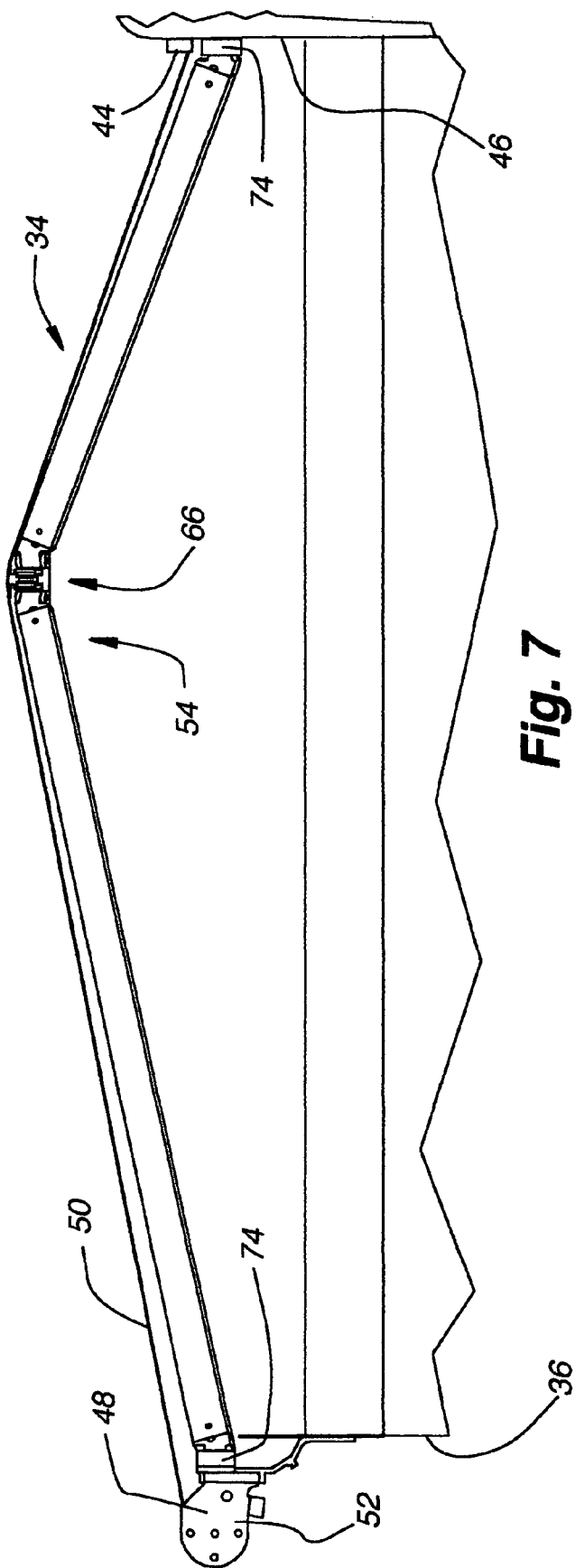
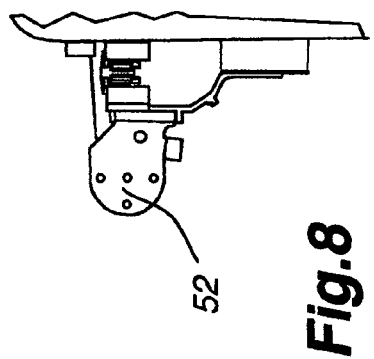
Fig. 7
Fig. 8

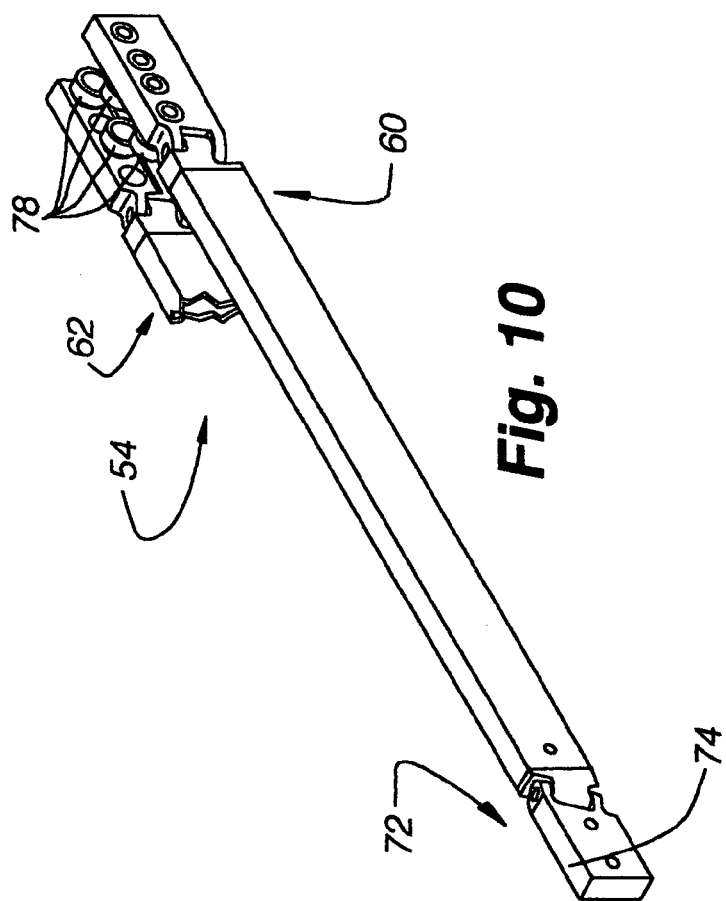
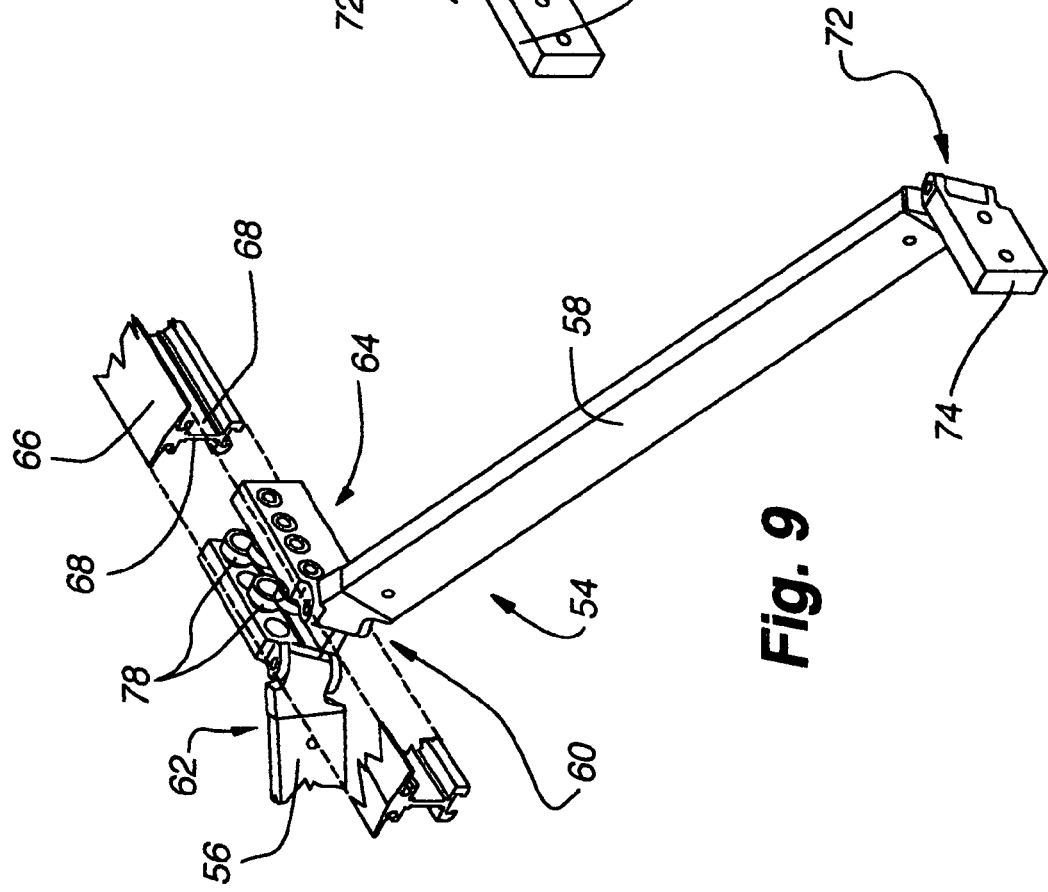
Fig. 10
Fig. 9

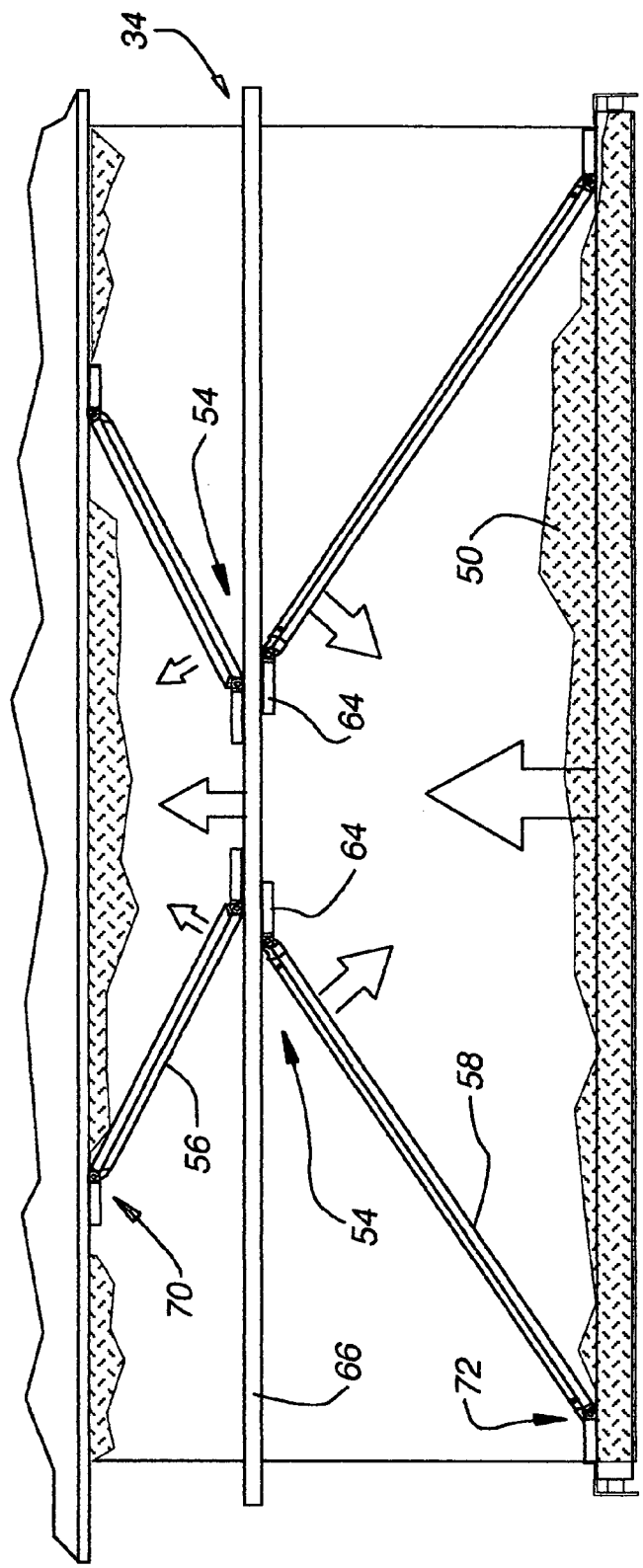
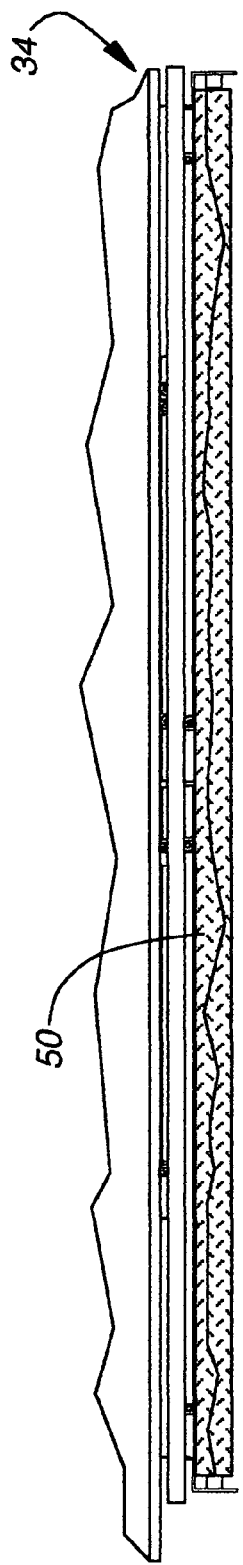
Fig. 12
Fig. 13

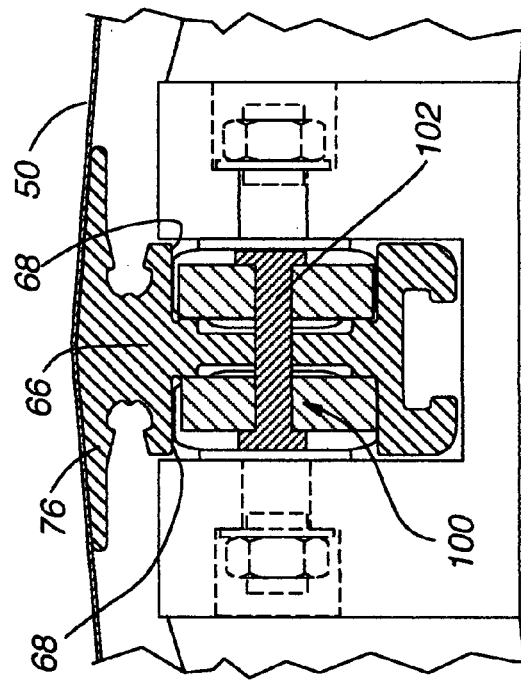
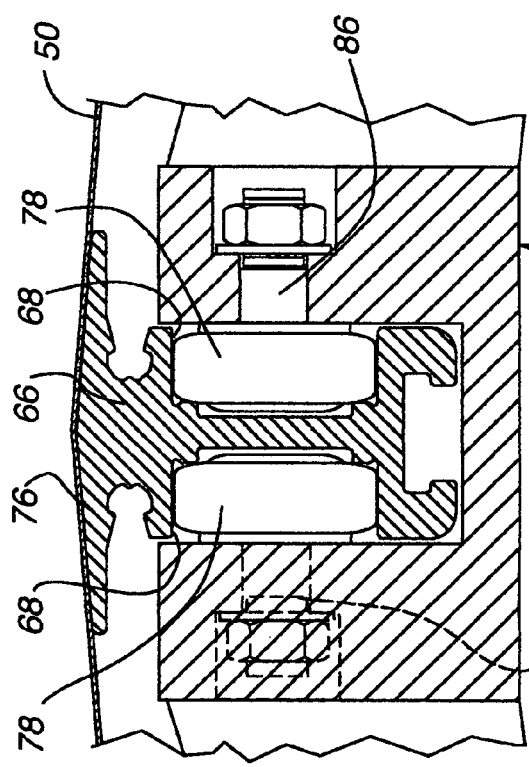
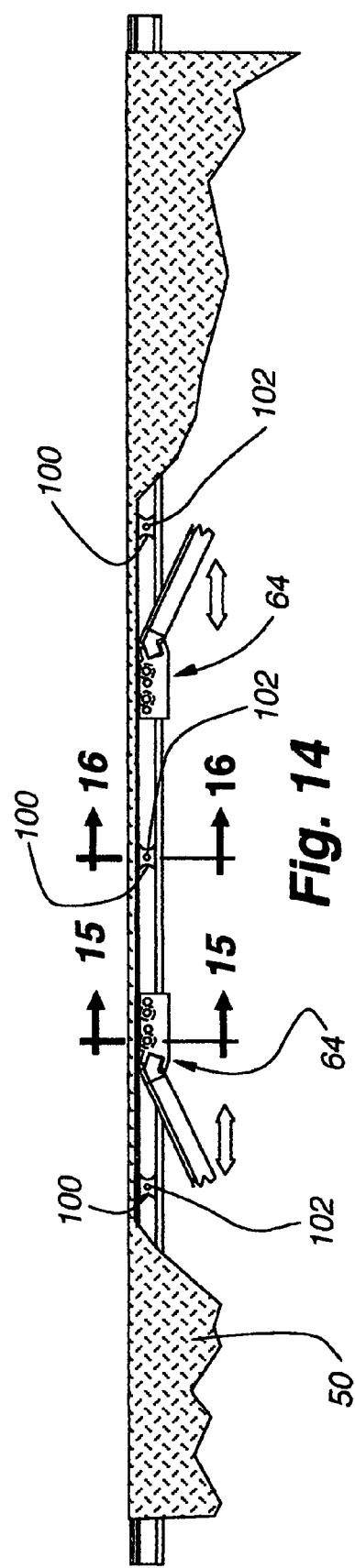

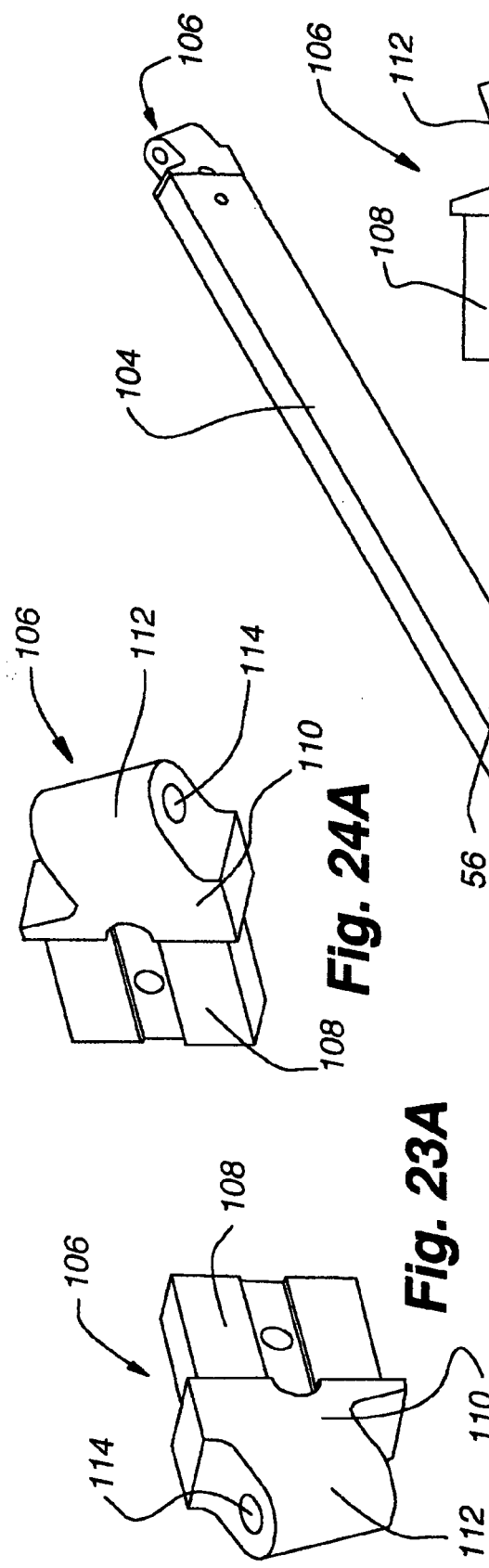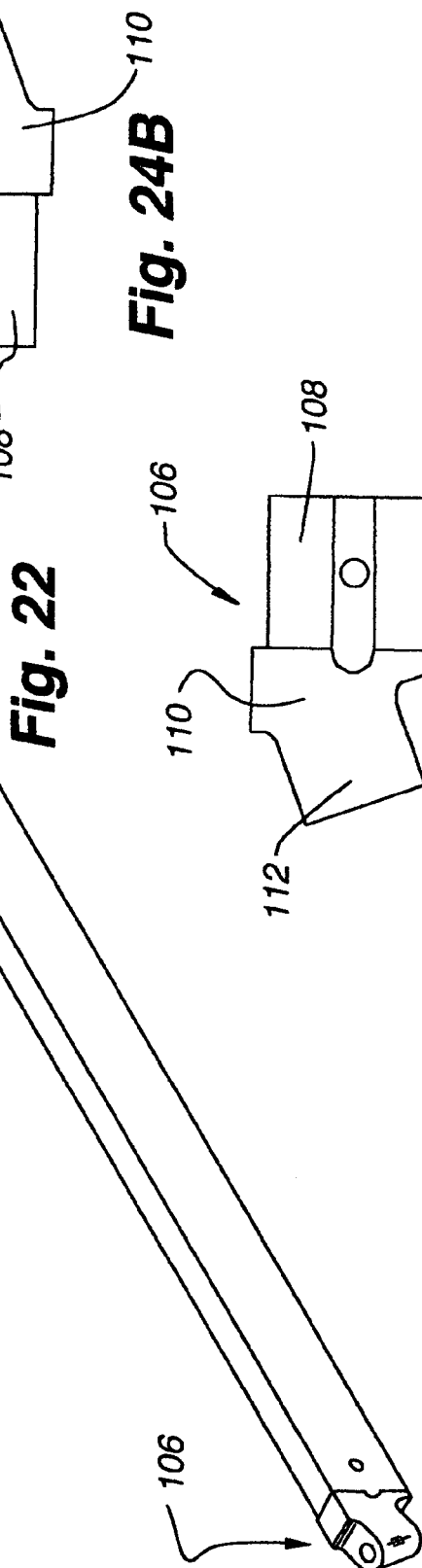

US 7,017,976 B1

AWNING COVER FOR SLIDE-OUT UNIT FOR RECREATIONAL VEHICLES

BACKGROUND OF THE INVENTION

1. Field of the Invention

An awning cover for a slide out unit found on recreational vehicles, mobile homes and the like includes a canopy and scissors-type support arms which extend as the slide out unit is extended from the main body of the vehicle. The scissors arms are mounted at a bias so that a support bar across the underside of the canopy is raised as the awning cover is extended and lowered as the awning cover is retracted with the slide out unit.

2. Description of the Relevant Art

Mobile homes have been a mainstay for housing for many years, and in more recent years, motor home type structures have been used and are referred to as recreational vehicles. Similarly, trailers incorporating features of a recreational vehicle are becoming more popular and in each instance, it has become desirable to have the main body of the mobile home, recreational vehicle, trailer or the like expandable to selectively enlarge the living space within the vehicle. In order to accommodate such enlargement, mobile homes, recreational vehicles, trailers and the like are now sometimes provided with slide a out unit, which is a box-like structure having top and bottom walls as well as side walls and an outer wall with the box-like enclosure being motor driven between a retracted position within the interior of the vehicle and an extended position away from one side of the vehicle.

A common problem encountered with slide out units resides in the fact that debris, such as leaves, dust, dirt or the like will accumulate on the top wall of the slide out unit when the unit is extended. And when the unit is subsequently retracted, the debris is brought into the interior of the vehicle. To avoid debris being brought into the vehicle during a retraction of a slide out unit, covers have been provided over the top of the unit which extend along with the slide out unit and also retract with the unit. Any debris accumulating on the cover is therefore discarded as the unit retracts and the cover is rolled into a housing mounted on the side of the vehicle.

An example of an extendable cover for slide-out units is found in U.S. Pat. No. RE 37,567, which is of common ownership with the present application, and while overcoming some problems that were previously prevalent with the use of slide out units, have not been entirely satisfactory as the cover is flat when extended and generally coextensive with the top of the slide out unit so that debris, rain and the like will accumulate on the cover.

It is to provide improvements in awning covers for slide out units that the present invention has been developed.

SUMMARY OF THE INVENTION

An awning cover for a slide out unit on a mobile home, recreational vehicle, travel trailer or the like includes a canopy having one edge secured to the side of the vehicle and the other edge to an outer wall of the slide out unit. Either the inner or outer edge of the canopy is mounted on a retractable roll bar so that the cover can be extended with the slide out unit into an extended position covering the top of the slide out unit or retracted and wrapped around the roll bar when the slide out unit is retracted into the vehicle.

The canopy is supported between the inner and outer edges by scissors-type support arms which in turn support a support bar or rail extending longitudinally of the vehicle and intermediate the inner and outer edges of the canopy. The scissors arms are mounted on a bias so that as the slide out unit is extended from the vehicle and the awning canopy is unrolled from the roll bar, the scissors arms are extended while elevating the support bar whereby the canopy assumes a gabled roof-like configuration over the slide out unit. When the slide out unit is retracted, the support bar is lowered and folded into adjacent relationship with the scissors arms and adjacent to the side of the vehicle.

Other aspects, features and details of the present invention can be more completely understood by reference to the following detailed description of a preferred embodiment, taken in conjunction with the drawings and from the appended claims.

BRIEF DESCRIPTION OF THE DRAWINGS

FIG. 7 is a fragmentary side elevation of the awning cover of the present invention mounted on the slide out unit as seen in FIG. 5.

FIG. 8 is a fragmentary side elevation of the awning cover in a retracted position adjacent to the side of the vehicle.

FIG. 9 is a fragmentary isometric with parts removed looking at the juncture of scissors arms with the support bar in the awning cover of the present invention with the scissors arms in an extended position.

FIG. 10 is a fragmentary isometric similar to FIG. 9 with the scissors arms in a retracted position.

FIG. 12 is a top plan view similar to FIG. 11 with the awning cover partially retracted.

FIG. 13 is a top plan view similar to FIGS. 11 and 12 with the awning cover fully retracted.

FIG. 14 is a fragmentary front elevation with parts removed of the support bar and its connection to the scissors arms with the awning cover in an extended position.

FIG. 15 is an enlarged fragmentary section taken along line 15—15 of FIG. 14.

FIG. 16 is an enlarged fragmentary section taken along line 16—16 of FIG. 14.

FIG. 22 is an isometric of a scissors arm.

FIG. 23A is an isometric of a connector used at the left end of the scissors arm as seen in FIG. 22.

FIG. 23B is a side elevation of the connector shown in FIG. 23A.

FIG. 24A is an isometric of a connector used at the right end of a scissors arm as shown in FIG. 22.

FIG. 24B is a side elevation of the connector of FIG. 24A.

DESCRIPTION OF THE PREFERRED EMBODIMENT

Figure 1:
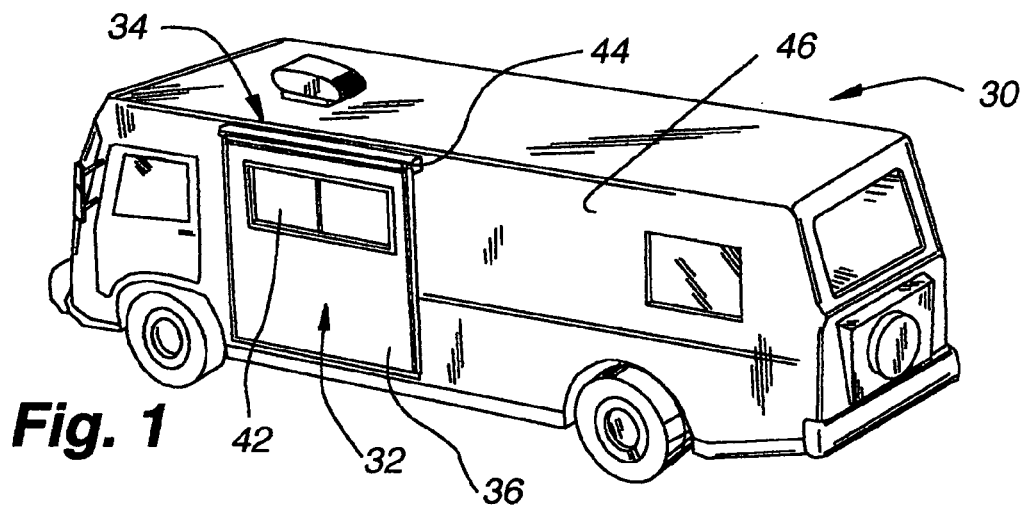
FIG. 1 is an isometric of a recreational vehicle having a slide out unit with the awning cover of the present invention mounted thereon and with the slide out unit in a retracted position.
Figure 2:
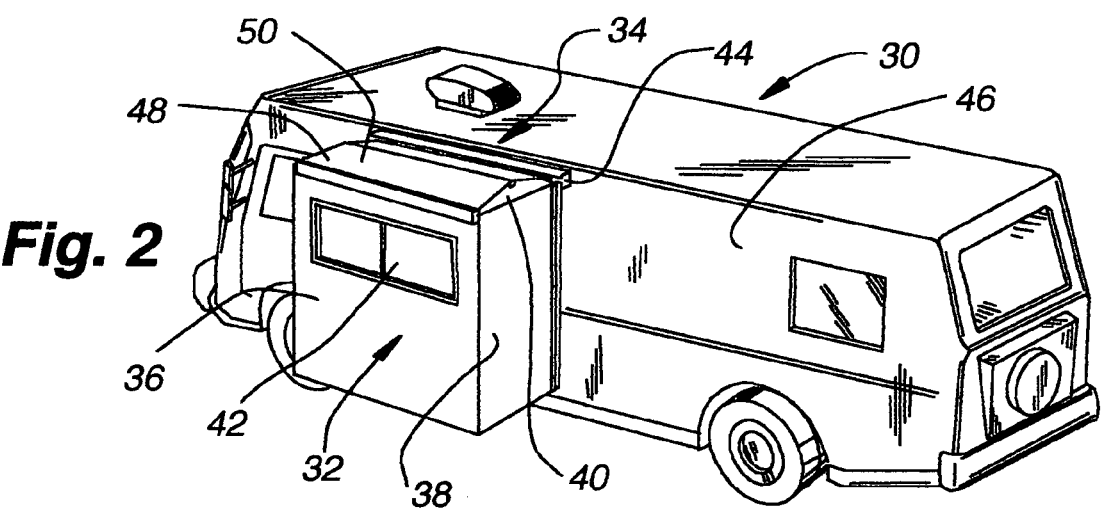
FIG. 2 is an isometric similar to FIG. 1 with the slide out unit in an extended position.

A recreational vehicle 30 is illustrated in FIGS. 1 and 2 having a slide out unit 32 incorporated therein with the slide out unit being retracted into the unit in FIG. 1 and extended away from the side of the unit in FIG. 2. It is to be understood that slide out units are found in other environments such as mobile homes, travel trailers and the like, and accordingly the teachings of the present invention are applicable to those environments as well.

Figure 3:
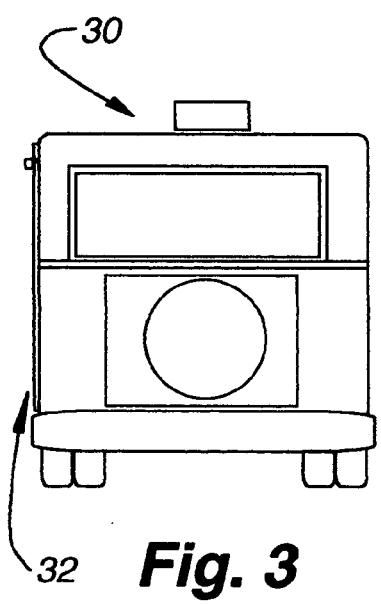
FIG. 3 is a rear elevation of the vehicle of FIG. 1.
Figure 4:
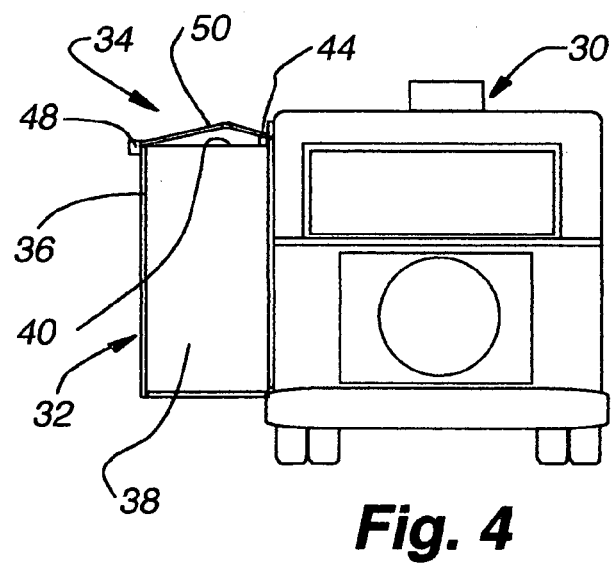
FIG. 4 is a rear elevation of the vehicle as shown in FIG. 2.

The awning cover 34 of the present invention can be generally seen in FIGS. 1 through 4 to comprise a gabled cover for the slide out unit 32 with the awning cover being correspondingly extendable with the slide out unit to assume the position of FIGS. 2 and 4 and correspondingly retracted with the slide out unit to assume the position of FIGS. 1 and 3. Before describing the awning cover in detail, it should be appreciated that the slide out unit has an outer wall 36, a pair of side walls 38, a bottom wall (not seen) and a top wall 40. The slide out unit may have windows 42 or the like in the outer wall as an optional feature of the slide out unit. The slide out unit is motorized in a conventional manner to move between the retracted position of FIGS. 1 and 3 and the extended position of FIGS. 2 and 4.

Figure 5:
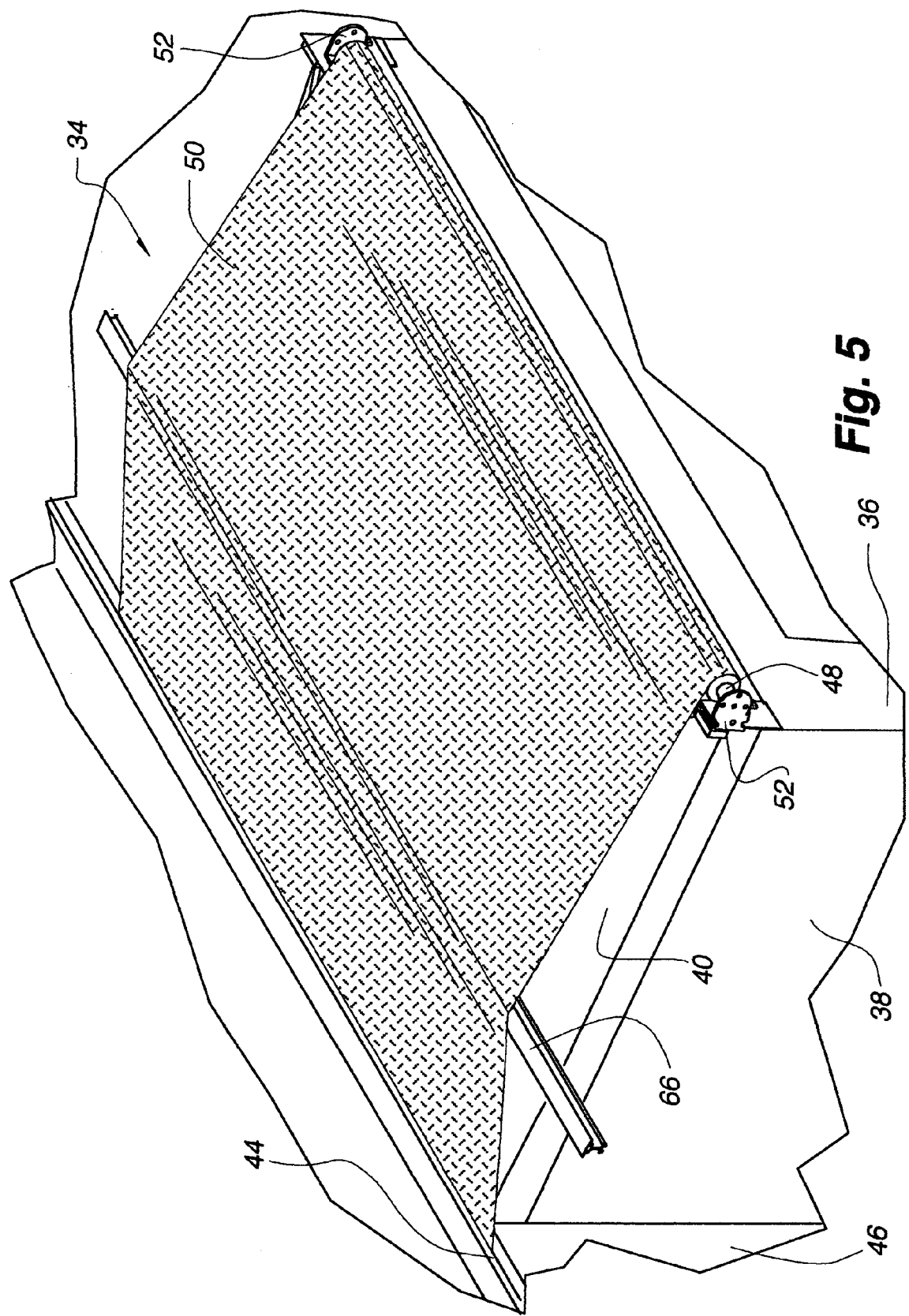
FIG. 5 is a fragmentary isometric looking downwardly on the awning cover of the present invention in an extended position.
Figure 6:
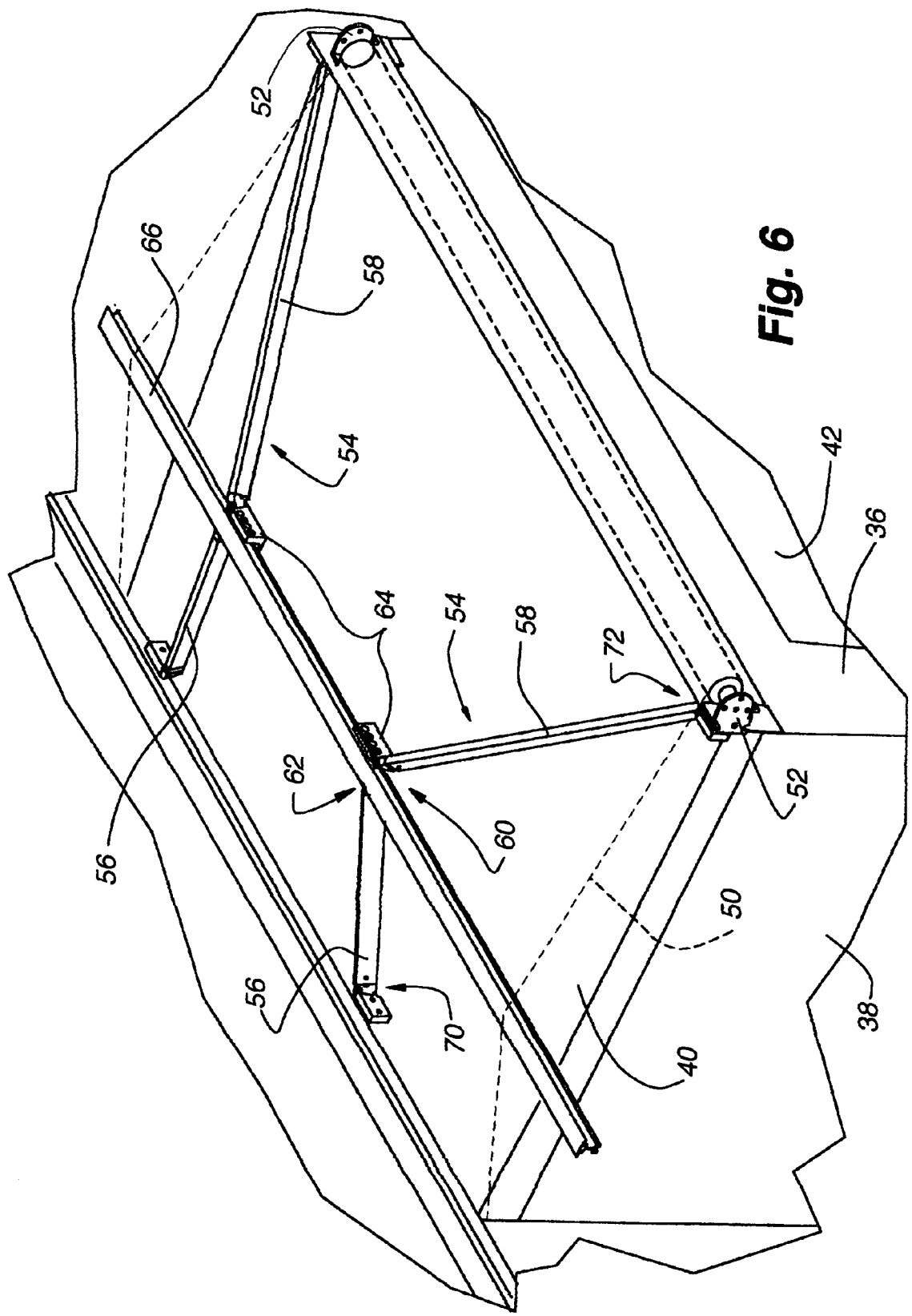
FIG. 6 is a fragmentary isometric similar to FIG. 5 with the canopy being shown in dashed lines.

The awning cover 34 of is probably best seen in FIGS. 5 and 6 to include an anchor rail 44 mounted horizontally on the side wall 46 of the recreational vehicle, mobile home, travel trailer or the like adjacent the top of the side wall, a roll bar 48 extending parallel to the anchor rail and a flexible canopy 50 of generally rectangular configuration having an inner edge secured to the anchor rail 44 and an outer edge to the roll bar 48. The roll bar is rotatably mounted on brackets 52 adjacent to the top edge of the outer wall 36 of the slide out unit with the roll bar being of conventional construction and spring biased so as to encourage the canopy to wrap therearound as the slide out unit is moved from the extended position of FIG. 2 to the retracted position of FIG. 1. Of course, when the slide out unit 32 is extended along with the awning cover 34, the canopy 50 unrolls from the roll bar against the spring bias of the roll bar. It should also be appreciated that the roll bar could be mounted on the side of the vehicle as opposed to the outer wall of the slide out unit with the anchor rail being on the outer wall of the slide out unit. It is only important that one edge of the canopy be anchored and the other edge be secured to a roll bar so that the canopy can be wrapped around the roll bar during retraction of the slide out unit.

Figure 11:
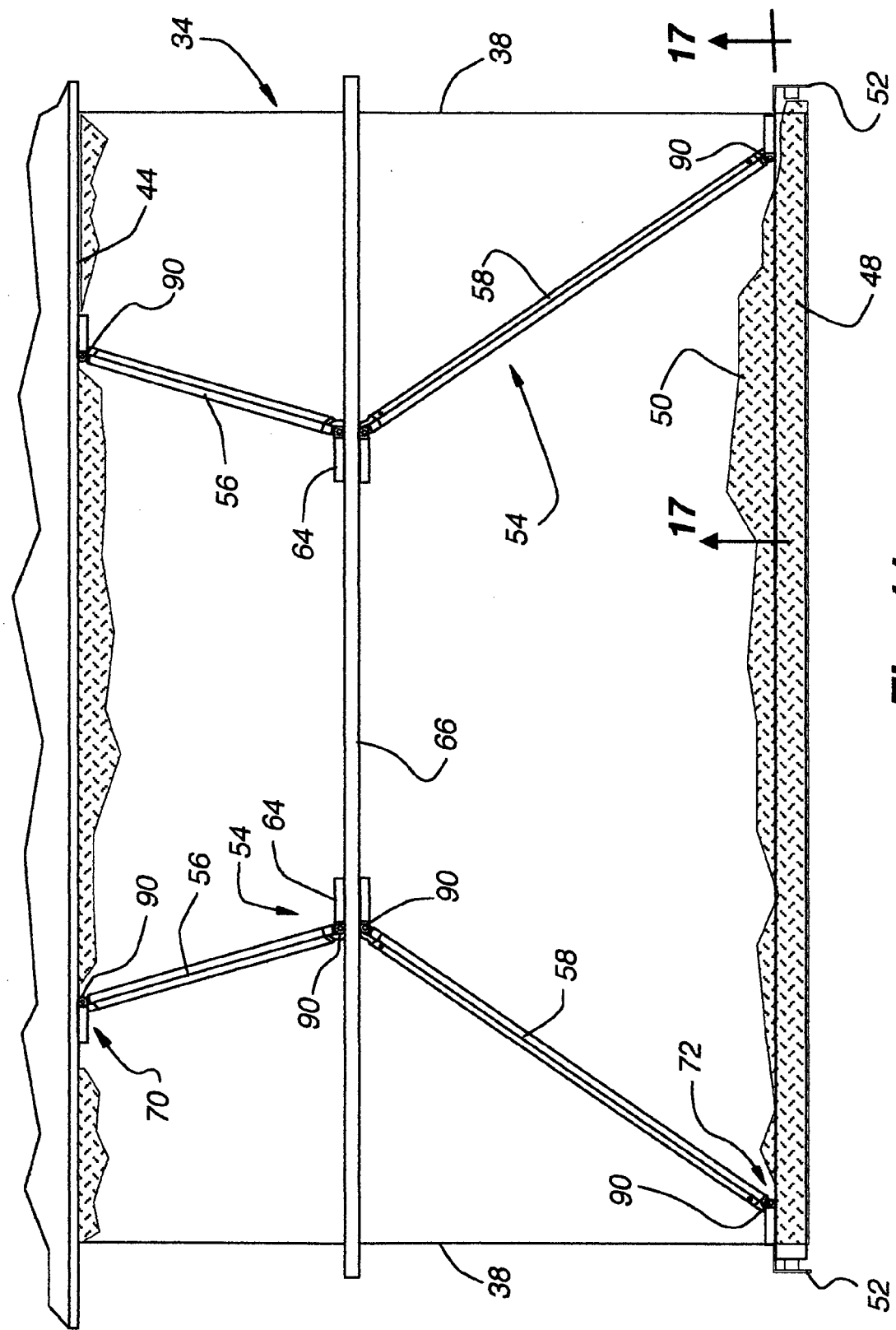
FIG. 11 is a top plan view of the awning cover of the present invention mounted on the slide out unit with portions of the canopy removed for clarity and with the awning cover in a fully-extended position.

The canopy 50 is supported from underneath by a scissors-type support system incorporating two identical pairs of scissor arms 54. Each pair of scissor arms has a shorter inner support arm 56 and a longer outer support arm 58 even though the length of the support arms is not critical to the invention. The inner end 60 of each outer support arm 58 and the outer end 62 of each inner support arm 56 is connected to a roller bracket 64 that is supported and rollably mounted on an elongated support bar 66 having tracts 68 on opposite sides thereof. Movement of the awning cover 34 from a retracted position of FIG. 13, for example, to an extended position of FIG. 11 causes the roller brackets to roll along the length of the support bar toward opposite longitudinal ends thereof. Obviously a retraction of the awning cover from the position of FIG. 11 to the fully-retracted position of FIG. 13 causes the roller brackets to roll toward a midpoint of the support bar and toward each other as the scissors arms 54 are folding inwardly toward a parallel and adjacent relationship with the support bar 66. The inner ends 70 of the inner support arms 56 and the outer ends 72 of the outer support arms 58 are pivotably connected to mounting brackets 74 with the mounting brackets for the inner support arms being mounted on the side wall 46 of the recreational vehicle immediately beneath the anchor rail 44 and the mounting brackets for the outer support arms being mounted on an inner face of the roll bar 48. The pivotal mounting of each end of a support arm 56 or 58 to either the roller bracket 64 or a mounting bracket 74 permits folding and unfolding movement of the scissors arms as the slide out unit and awning cover move simultaneously between the extended and retracted positions.

Figure 18:
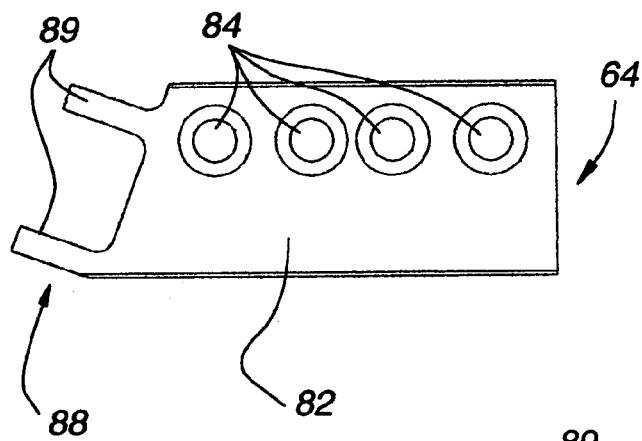
FIG. 18 is a side elevation of a bracket used to connect the scissors arms to the center support rail.
Figure 19:
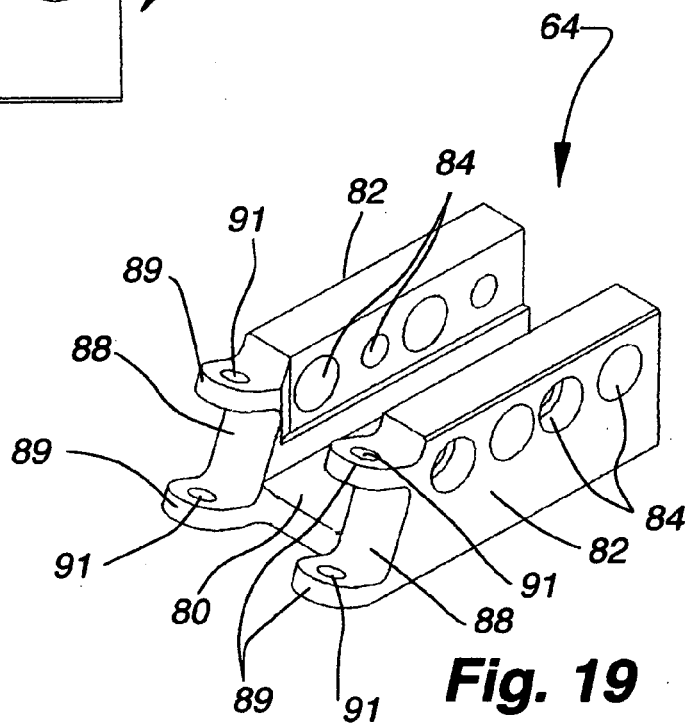
FIG. 19 is an isometric of the bracket of FIG. 18.

With reference to FIGS. 14 through 16, it will be appreciated that the support bar 66 is of generally I-beam construction having a gabled top surface 76 and as mentioned previously tracts 68 defined in each longitudinal side. The tracts confine roller wheels 78 mounted on the roller brackets 64 seen best in FIGS. 18 and 19 to allow the roller brackets to move longitudinally along the length of the support bar.

Each roller bracket 64 is of generally channel-shaped configuration, having a bottom wall 80 and a pair of upstanding side walls 82 with the side walls having aligned passages 84 therethrough which serve as bearings for the axles 86 of the roller wheels 78 positioned in the channel of the roller bracket. In a preferred embodiment, there are two roller wheels associated with each side wall of each roller bracket with a pair of roller wheels being disposed for engagement with the track on one side of the support bar and a pair of roller wheels with the track on the opposite side of the support bar. The wheels on opposite sides are longitudinally offset from each other. At one end of the roller bracket 64, bifurcated supports 88 having fingers 89 are established for receiving pivot pins 90 (FIG. 11) associated with the ends of the inner and outer support arms 56 and 58 associated with that roller bracket. It will be appreciated that while the bifurcated supports 88 are of course separated from each other to each receive one end of a support arm 56 or 58 as will be described later, each finger has an opening 91 therein which will be described later to pivotally receive a pivot pin 90 so that the pivot pin lies in a vertical plane but at an acute angle to vertical, such as approximately 30°.

Figure 20:
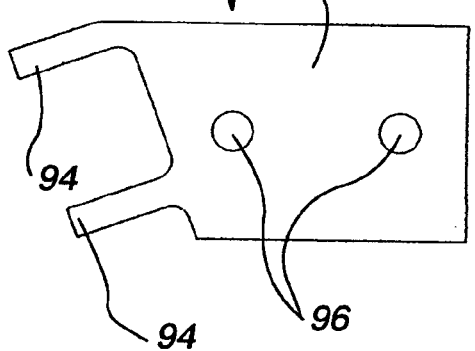
FIG. 20 is a side elevation of a bracket used to connect a scissors arm to either the anchor rail or the roll bar.
Figure 21:
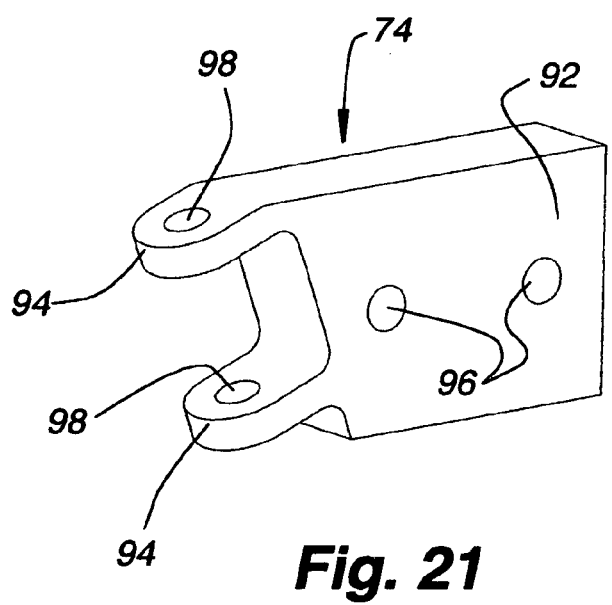
FIG. 21 is an isometric of the bracket of FIG. 20.

The mounting or anchor brackets 74 for pivotally mounting the opposite ends of each of the support arms 56 and 58 are identical and shown in FIGS. 20 and 21. It will there be seen that each anchor bracket has a box-like main body 92 with bifurcated spaced fingers 94 protruding from one end of the main body. Passages 96 are provided through the main body so that the anchor brackets can be secured to either the side wall 46 of the vehicle or the outer wall 36 of the slide out unit. The bifurcated fingers 94 are again spaced from each other to pivotally receive an end of a support arm 56 or 58 with each arm having opposed openings 98 to receive a pivot pin 90 for the end of the associated support arm. The pivot pins while lying in a vertical plane are inclined relative to vertical at an acute angle of approximately 30°. As will be appreciated, the angle of inclination of the pivot pins on the roller brackets 64 and those on the anchor or mounting brackets 74 are in opposite directions relative to vertical.

The angled orientation of the pivot pins perform a function to be made more clear later in lifting the support bar 66 as the awning cover is extended and lowering the support bar when the awning cover is retracted.

With particular reference to FIGS. 14 through 16, and particularly FIGS. 14 and 15, the roller brackets 64 can be seen supporting a pair of roller wheels 78 from each of its upstanding side walls 82. The roller wheels on the opposite sides of the roller bracket as mentioned previously are offset longitudinally from each other but in combination allow the roller bracket to roll easily along the length of the support bar 66 within the tracks 68. Three clips 100 as seen in FIGS. 14 and 16 are positioned along the length of the support bar with one clip being at the approximate longitudinal midpoint of the support bar and the other two clips being equally spaced therefrom in opposite directions. Each clip is positively positioned in the tracks along opposite sides of the support bar by a rivet 102 with each clip having a component disposed in each track of the support bar. The clips are present in each track to engage the roller wheels in a roller bracket and thereby limit the movement of the roller brackets along the length of the support arm.

As will be appreciated by the above, the support bar 66 is supported only by the roller brackets 64 and the associated scissors support arms 56 and 58, and of course the roller brackets move along the length of the support bar. The clips 100 are provided to make sure that the support bar is centered when the awning cover is fully retracted or fully extended. Accordingly, the clips are positioned as mentioned previously with one clip at the longitudinal midpoint of the support bar so as to be engaged on opposite sides by the roller brackets when the awning cover is fully retracted. When the awning is fully extended, the roller brackets are adapted to engage the remaining two clips which as mentioned previously are spaced equidistantly from the centered clip. The clips are positioned so that the roller brackets engage the clips at either the fully extended or fully retracted position of the awning cover.

With reference to FIG. 22, a scissors support arm 56 is illustrated as comprising a hollow body 104 of rectangular transverse cross section having connectors 106 positively connected in the opposite ends thereof. The connectors are of identical construction but mounted in the ends of the scissors arm in opposite orientations. The connector can be seen in any one of FIG. 23A, 23B, 24A or 24B as including an insert 108 adapted to be received and anchored in the associated open end of the support arm and a protruding body 110 with the protruding body having a rounded, partially cylindrical extension 112, with a passage 114 therethrough for receipt of a pivot pin 90. The passage 114 through the extension is adapted to remain in a vertical plane during operation of the awning cover 34 but is inclined relative to vertical at an acute angle of for example 30°. The extension 112 at the left end of the scissors arm is shown inclined downwardly and to the left so that the passage 114 therethrough is inclined upwardly and to the left while the connector 106 at the opposite or right end of the scissors arm has its extension 112 sloped upwardly to the right so that the passage 114 therethrough is sloped upwardly and to the left parallel with that of the passage in the connector at the left end of the support arm. Each support arm 56 or 58 is identical except in its length with the two outer support arms 58 being of the same length and the two inner support arms 56 being of the same length even though all four support arms could be of the same length if desired. The left end of the support arm illustrated in FIG. 22 is mountable to the roller bracket 64 while the right end is mountable to an anchor bracket 74. The connectors 106 are mounted to the roller bracket or the anchor bracket with pivot pins 90 as mentioned previously in a conventional manner so that each end of a support arm is adapted to pivot relative to its associated roller bracket or anchor bracket.

Figure 17:
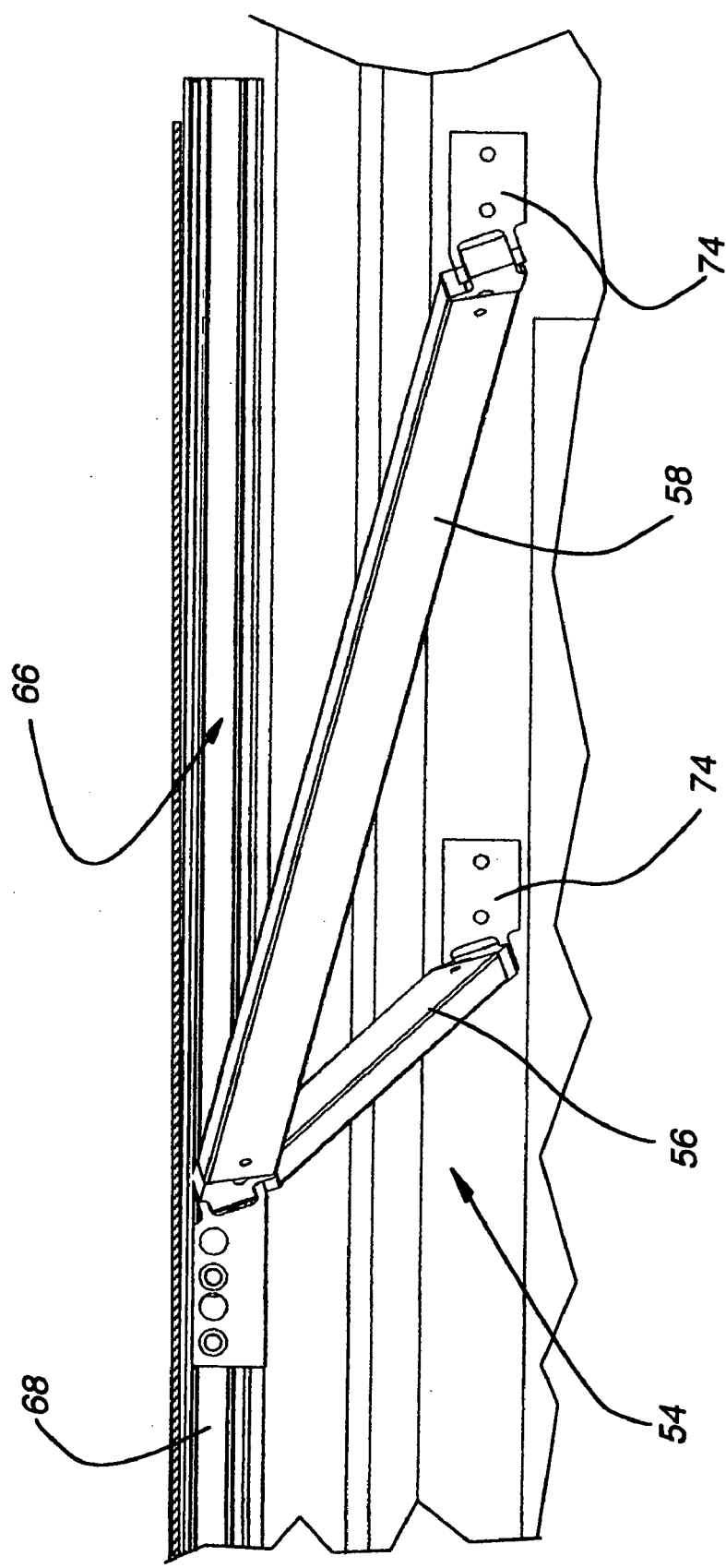
FIG. 17 is an enlarged fragmentary section taken along line 17—17 of FIG. 11.

As is probably best appreciated by reference to FIGS. 9, 10 and 17, due to the angulated mounting of the pivot pins 90 connecting the support arms 56 and 58 to the roller brackets 64 and the anchor brackets 74, the support arms are alignable with the roller brackets and anchor brackets as well as the anchor rail 44 or roll bar 48 when the awning cover is fully retracted as best seen in FIG. 10. This of course is the position of one pair of support arms and the associated roller bracket when the awning cover is fully retracted. When the awning is extended, however, as shown in FIGS. 9 and 17, due to the angle of the pivot pins 90 at each end of a support arm, the end of the support arm connected to the roller bracket is elevated relative to its opposite end, thereby positioning the support bar 66 and of course the flexible canopy 50 overlying the support bar at an elevated position. As the awning cover is extended and the support bar is lifted, as mentioned previously, the roller brackets roll along the support bar from the substantially centered position of FIG. 13 through an intermediate position of FIG. 12 to an outermost position of FIG. 11 where they engage the outer two clips.

Raising the support bar 66 as the awning cover 34 is extended creates a gabled configuration for the awning canopy 50 in the fully extended position, so that rain, debris and the like are encouraged to run off the canopy rather than accumulate on the canopy as in prior art arrangements. A gutter (not shown) may be provided along the side wall of the vehicle to transfer any water that runs off toward the side wall 46 of the vehicle to be directed to one side or the other of the slide out unit 32.

Although the present invention has been described with a certain degree of particularity, it is understood the disclosure has been made by way of example, and changes in detail or structure may be made without departing from the spirit of the invention, as defined in the appended claims.

The invention claimed is:

1. A retractable awning movable between extended and retracted positions comprising in combination:
   an awning canopy having first and second opposite parallel edges,
   an anchor rail secured to one of said edges,
   a roll bar secured to the other said edges,
   said roll bar and rail being end separated from each other in said extended position with said canopy extended between said anchor rail and roll bar,
   a support system having opposite ends positioned adjacent to said anchor rail and roll bar, said support system including a support bar positioned beneath said canopy and between said anchor rail and roll bar when the awning is extended and means for elevating said support bar relative to said anchor rail and roll bar as said awning is moved from said retracted position to said extended position.

2. The awning of claim 1 wherein said support system comprises a scissors-type mechanism including a pair of support arms, said pair of support arms having first ends pivotally connected to said support bar and opposite ends pivotally disposed adjacent to said anchor rail and said roll bar.

3. The awning of claim 2 wherein said pivotal connections to said support bar and said pivotal disposition adjacent to said anchor rail and roll bar define pivot axes which are parallel, lie in a vertical plane and form an acute angle with vertical.

4. The awning of claim 3 wherein said pivotal connections to said support bar are slidable along the length of said support bar.

5. The awning of claim 4 wherein there are two pair of support arms and the pivotal axes of one pair of support arms form an opposite acute angle with vertical than the corresponding pivotal axes of the other pair of support arms.

6. A retractable cover operationally interconnecting a fixed wall and movable wall for a slide out unit said cover being moveable between an extended position and a retractable position and comprising in combination:
a horizontal anchor rail secured to one of said fixed side wall or movable wall,
a horizontal roll bar secured to the other said fixed wall or movable wall,
a canopy secured along one edge adjacent to said anchor rail and along an opposite edge adjacent to said roll bar, said canopy being wrapped about said roll bar in the retracted position of the cover, and
a support system having opposite ends adjacent to said anchor rail and roll bar, said support system including a support bar positioned beneath said canopy and between said anchor rail and roll bar when the cover is extended and means for elevating said support bar relative to said anchor rail and roll bar as said cover is moved between said retracted and extended positions.

7. The cover of claim 6 wherein said support system comprises a scissors-type mechanism including a pair of support arms, said pair of support arms having first ends pivotally connected to said support bar and opposite ends pivotally disposed adjacent to said anchor rail and said roll bar.

8. The cover of claim 7 wherein said pivotal connections to said support bar and said pivotal disposition adjacent to said anchor rail and roll bar define pivot axes which are parallel, lie in a vertical plane and form an acute angle with vertical.

9. The cover of claim 8 wherein said pivotal connections to said support bar are slidable along the length of said support bar.

10. The cover of claim 9 wherein there are two pair of support arms and the pivotal axes of one pair of support arms form an opposite acute angle with vertical than the corresponding pivotal axes of the other pair of support arms.

* * * * *

UNITED STATES PATENT AND TRADEMARK OFFICE
CERTIFICATE OF CORRECTION

| | | |
|---|---|---|
| PATENT NO. | : 7,017,976 B1 | Page 1 of 1 |
| APPLICATION NO. | : 10/964840 | |
| DATED | : March 28, 2006 | |
| INVENTOR(S) | : Jeffrey B. Rutherford and Robert Wagner | |

It is certified that error appears in the above-identified patent and that said Letters Patent is hereby corrected as shown below:

<u>Column 6,</u>
Line 49, before "said roll bar", insert -- said anchor rail and roll bar being adjacent to each other in said retracted position --.

<u>Column 7,</u>
Line 15, after "fixed", delete "side".

Signed and Sealed this

Eleventh Day of July, 2006

JON W. DUDAS
*Director of the United States Patent and Trademark Office*